(12) United States Patent
Nieminen et al.

(10) Patent No.: US 7,072,945 B1
(45) Date of Patent: Jul. 4, 2006

(54) NETWORK AND METHOD FOR CONTROLLING APPLIANCES

(75) Inventors: Hannu Nieminen, Lempäälä (FI); Iikka Salminen, Hämeenlinna (FI); Timo Tuomisto, Nokia (FI)

(73) Assignee: Nokia Corporation, Nokia Group (FI)

( * ) Notice: Subject to any disclaimer, the term of this patent is extended or adjusted under 35 U.S.C. 154(b) by 977 days.

(21) Appl. No.: 09/608,394

(22) Filed: Jun. 30, 2000

(51) Int. Cl.
*G06F 15/16* (2006.01)

(52) U.S. Cl. ............... 709/217; 709/203; 709/229; 455/41.2; 455/41.3

(58) Field of Classification Search ........... 709/229, 709/203, 216, 217, 223, 226; 455/41.2, 41.3, 455/418, 419, 420
See application file for complete search history.

(56) References Cited

U.S. PATENT DOCUMENTS

| | | | |
|---|---|---|---|
| 5,485,634 A * | 1/1996 | Weiser et al. | 455/507 |
| 5,579,221 A * | 11/1996 | Mun | 700/83 |
| 5,629,868 A * | 5/1997 | Tessier et al. | 348/164 |
| 5,909,183 A * | 6/1999 | Borgstahl et al. | 340/825.22 |
| 6,052,750 A * | 4/2000 | Lea | 710/72 |
| 6,393,297 B1 * | 5/2002 | Song | 455/466 |
| 6,415,023 B1 * | 7/2002 | Iggulden | 379/102.03 |
| 6,466,781 B1 * | 10/2002 | Bromba et al. | 455/411 |
| 6,564,056 B1 * | 5/2003 | Fitzgerald | 455/435.1 |
| 6,622,018 B1 * | 9/2003 | Erekson | 455/420 |
| 6,694,143 B1 * | 2/2004 | Beamish et al. | 455/456.1 |
| 6,763,247 B1 * | 7/2004 | Hollstrom et al. | 455/352 |
| 2001/0021884 A1 * | 9/2001 | Shinyagaito | 700/275 |
| 2001/0041982 A1 * | 11/2001 | Kawasaki et al. | 704/275 |
| 2002/0012329 A1 * | 1/2002 | Atkinson et al. | 370/330 |
| 2002/0110228 A1 * | 8/2002 | Silverman et al. | 379/110.01 |

FOREIGN PATENT DOCUMENTS

| | | | |
|---|---|---|---|
| WO | WO 99/06910 | * | 2/1999 |
| WO | WO 99/57237 | * | 11/1999 |
| WO | WO 99/57837 | | 11/1999 |

OTHER PUBLICATIONS

Concoran P M: "Mapping Home-Network Appliances to TCP/IP Sockets using a Three-Tiered Home Gateway Architecture" IEEE Transactions on Consumer Electronics, IEEE Inc. New York, US vol. 44, No. 3 Aug. 1998 pp. 729-736 XP 000851577.*

* cited by examiner

*Primary Examiner*—Ario Etienne
*Assistant Examiner*—LaShonda Jacobs
(74) *Attorney, Agent, or Firm*—Cohen, Pontani, Lieberman & Pavane

(57) ABSTRACT

An appliance network for controlling appliances from a remote location. The appliances include memory which contains an address location from which an appliance control module can be located for controlling a corresponding appliance. The address location is provided to a local controller, preferably by wireless transmission, which then uses the address location to access the appliance control module. Once accessed, the appliance control module is stored on a local server for use in controlling the corresponding appliance. In a preferred embodiment, a security feature is included to limit appliance control access to authorized users.

39 Claims, 3 Drawing Sheets

NETWORK AND METHOD FOR CONTROLLING APPLIANCES

BACKGROUND OF THE INVENTION

1. Field of the Invention

The present invention relates to a local network for providing remote control of appliances incorporated in the network.

2. Description of the Related Art

With the development of more sophisticated household appliances and the increased use of wireless communication technology such as, for example, Bluetooth, it is envisioned that household appliances will be networked to interact or communicate within a local environment, e.g., a home or office. Personal wireless communication devices and hand-held controllers such as mobile phones, personal digital assistants (PDAs) with a GSM card, etc., are convenient devices for controlling such appliances. However, most appliances still lack the processor power of, for example, full Java support needed for such advanced appliance control. Moreover, to obtain such interaction or interoperability among appliances, especially appliances from different manufacturers, complex standards and protocols must be adopted by the manufacturers so that a common "language" will be employed. This, however, is a further drawback because most appliance manufacturers prefer to develop and utilize separate and proprietary operating protocols for their appliances which are not interchangeable or useable with appliances from other manufacturers.

Accordingly, a local network is desired which provides for interoperability of appliances without the need for a common operating protocol.

SUMMARY OF THE INVENTION

The present invention is directed to a process and network for providing interaction and control of appliances in a common environment. Each appliance, e.g. coffee maker, VCR, dishwasher, room heating thermostat, etc., has an appliance control module (ACM) software application which is made available by the appliance manufacturer. A local wireless communication interface, such as Bluetooth, is integrated with each appliance for communicating with a local controller and server, such as a wireless communications device (e.g., mobile phone, PDA with GSM capability, etc.), which may, optionally, operate in conjunction with a local computer. The ACM is installed onto the local server and control of the corresponding appliance can then be performed by accessing the local server with the local controller, e.g., by use of a mobile phone.

In a preferred embodiment, each ACM is accessible from a remote location such as an Internet web site associated with the appliance manufacturer. Each appliance is equipped with a memory for storing a manufacturer internet address and, optionally, an appliance identification code such as a model or serial number. When an appropriate command is received by an appliance such as by an associated Bluetooth receiver, the appliance transmits a remote location address, e.g., an Internet web address such as a URL, of the appliance manufacturer to the local controller. Along with the URL, the appliance identifier such as a model and/or serial number may be communicated. This information is then used to access a remote server to obtain the appropriate appliance control module which will be installed on the local server for use in controlling the appliance.

In accordance with the present invention, the local server may be integrated into a mobile device or the mobile device may function as a user interface (UI) for accessing the local server.

In accordance with another embodiment of the present invention, the ACM may be a device independent module, e.g. Java Remote Method Invocation. Alternatively, as the remote appliance manufacturer server will recognize the type of operating system used by the local server due to the contact made by the local server, the ACM may be platform dependent binary code. Thus, based on the operating system platform used by the local server, an appropriate and compatible version of the ACM will be provided by the remote server.

Once the appropriate ACM is installed in the local server, the appliance can be controlled by accessing the ACM in an appropriate manner, such as by entering appropriate commands in a wireless device (e.g. mobile phone) which is in communication with the local server. Such communication may occur via a local communication link which may be a wireless or hard-wired link, or via an Internet connection such as when a mobile phone is used to access the local server via the Internet.

In a preferred embodiment, security functionality is provided or incorporated in the local server for user authentication prior to accessing the appliance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the views.

DETAILED DESCRIPTION OF THE PRESENTLY PREFERRED EMBODIMENTS

Figure 1:
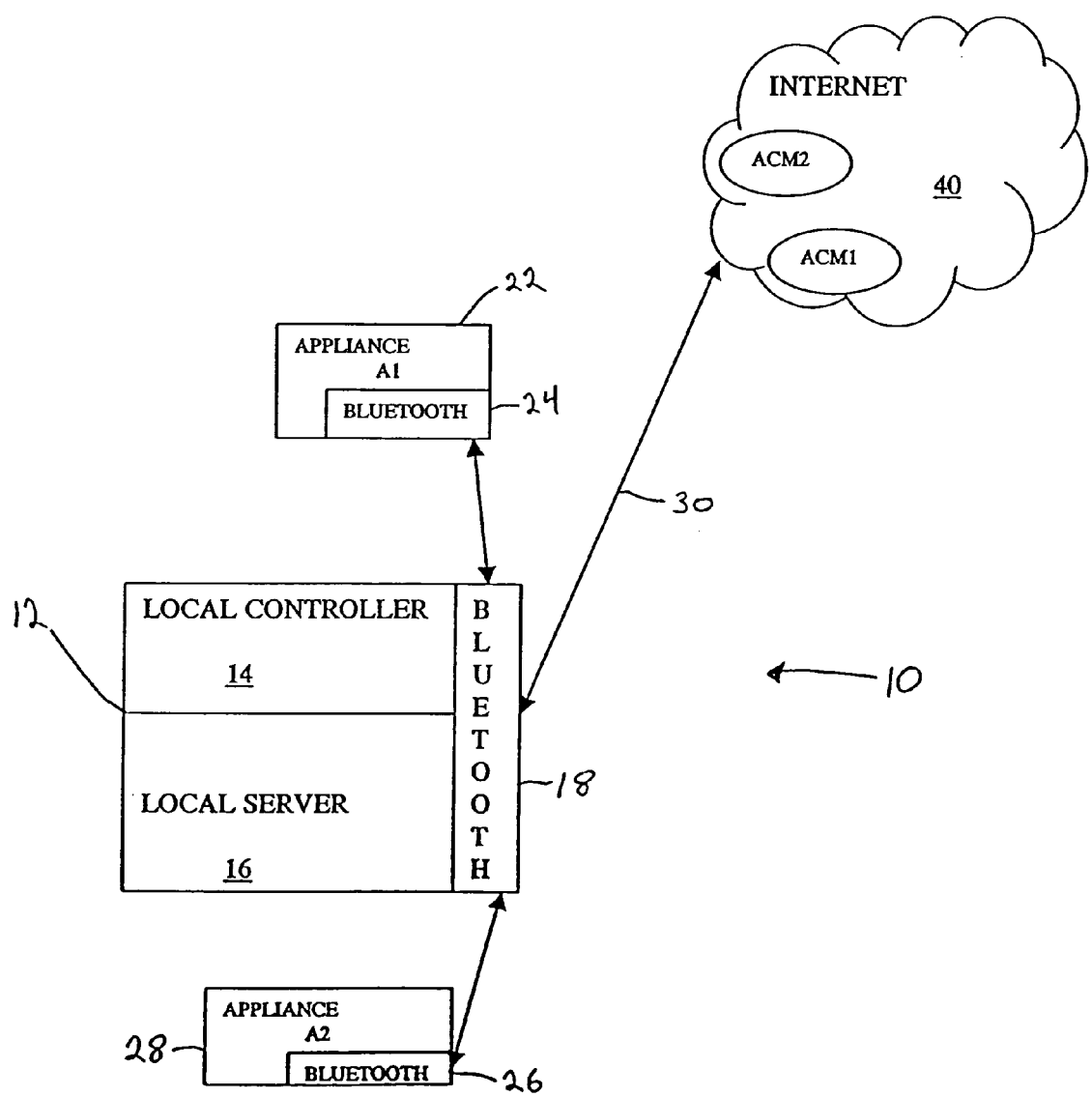
FIG. 1 is a schematic illustration of an appliance control network in accordance with a preferred embodiment of the present invention.

FIG. 1 illustrates a presently preferred network 10 in accordance with the present invention. Network 10 includes a control block 12 containing a local controller 14, a local server 16, and a wireless local transceiver 18 for wirelessly communicating signals among a first appliance (A1) 22 and a second appliance (A2) 28 within the network 10. The appliances 22, 28 can be any variety of commonly-known appliances such as, for example, a dishwasher, coffee maker, VCR, oven, room heater thermostat, etc., and each is in communication with control block 12 such as by hard-wiring connection or, more preferably, by a wireless transceiver 24, 26 for communicating with transceiver 18. It is presently contemplated that Bluetooth transceivers which provide for communication between two or more devices within a range of 10 meters, for a normal power mode, and up to 300 meters, for a high power mode, will be employed in the appliances and control block in a manner known to those having ordinary skill in the art. As explained more fully below, each appliance A1, A2 has a corresponding appliance control module (ACM) offered by or on behalf of the appliance manufacturer and used by the local server 16 to operate the appliance.

The ACM is a software driver package that provides an interface to the services offered by the appliance. The ACM may accompany the appliance (e.g. as a diskette, CD or other software storage means included in the appliance packaging or offered by the appliance manufacturer), or may be available over the Internet. When an appliance is purchased, the ACM can be installed onto the local server in a manner well-known to those having ordinary skill, such as by inserting the ACM diskette into a computer disk drive. In a preferred embodiment, each appliance will have a memory which contains a UL indicating an Internet address of the ACM. The appliance memory may also contain additional information such as an appliance model or serial number, etc.

The local controller 14 and local server 16 may be integrally formed in the control block 12, as shown in FIG. 1, and may be implemented by a wireless communications device having appropriate processing capabilities for operating or executing the appropriate ACM for a corresponding appliance. Mobile phones or PDAs and lap top computers having GSM capability may be suitable for this purpose. Alternatively, and as illustrated in the network 10 of FIG. 2, the local controller 14 may be separate and discrete from the local server 16. In this embodiment, the appliances A1, A2 are interfaced with the local server 16 in the same manner as in the network of FIG. 1 (e.g. using Bluetooth transceivers), with the local controller 14 used to provide appropriate commands to the local server. Thus, in the embodiment of FIG. 2, local controller 14 may be a standard mobile phone or other communications device with the local server function provided by a personal computer or other processing device located within an operating environment of the appliances (e.g. a home, office, etc.). In either case (i.e. the embodiment of FIG. 1 or FIG. 2), it should be understood that although only two appliances are shown, this is done for illustration only, and numerous appliances can be incorporated in the inventive network without departing from the scope of the invention.

With continued reference to FIG. 1, the control block 12 is connectable to a global computer network, such as the Internet 40, in any well known manner, such as through wireless or wired connection 30. As stated above, each appliance A1, A2 has a corresponding ACM which may be provided with each appliance (e.g. a diskette, etc.) or which may be contained on or accessible via the Internet 40. If accessible over the Internet, the location of the corresponding ACM will be provided via an associated web site address or URL. For example, the desired ACM may be located at a general web site of the appliance manufacturer which may also contain general information about the manufacturer and its products, etc. Alternatively, the ACM may be located at a specific web site established by or with the authority of the appliance manufacturer for containing the appliance control modules of numerous appliances. In either case, the location of the desired ACM (e.g. the URL) is used by the control block 12 to access the ACM. The ACM will then be installed on the local server 16, in a manner known in the art, for controlling the corresponding appliance. Once installed, the appliance corresponding to the ACM can be controlled through the input of appropriate commands on the local controller 14 and through local wireless communication to the corresponding appliances.

Figure 3:
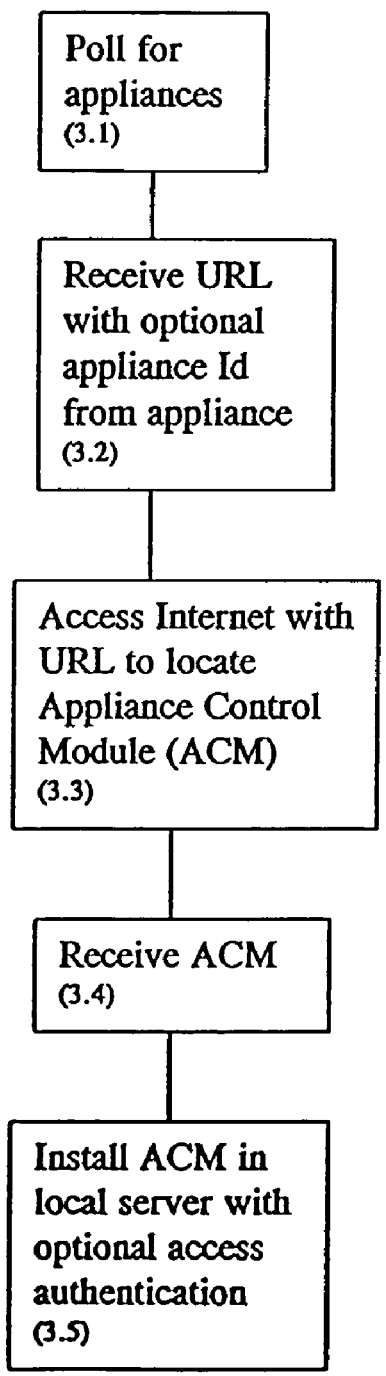
FIG. 3 is a block diagram of the steps performed in the method of the present invention.

Communication with the appliance for incorporating the appliance in the network 10 is initiated by the control block 12 such as through the local controller 16 by, in the case of a mobile telephone local controller, pressing an appropriate command or key or button on the mobile phone. This will cause the local controller to poll the appliances located within the local environment, e.g. within the Bluetooth transmission environment of 10–300 meters from the mobile phone. This is shown as step 3.1 in FIG. 3. The polling command will cause the polled appliances to transmit to the local controller the necessary ACM location information, such as the appliance manufacturer's URL, the appliance serial number, etc. (step 3.2). This information is then used by the local controller to determine whether a corresponding ACM is already installed in the local server 16. If an ACM is needed, the local controller uses the URL and other received information from the appliance to access the Internet 40 to locate the ACM (step 3.3). Alternatively, the local controller may prompt a user to install a provided disc containing the ACM. Once the ACM is obtained, it is copied to either the local controller 14 or the local server 16 (step 3.4) and is installed on the local server (step 3.5) for operating the corresponding appliance.

Figure 2:
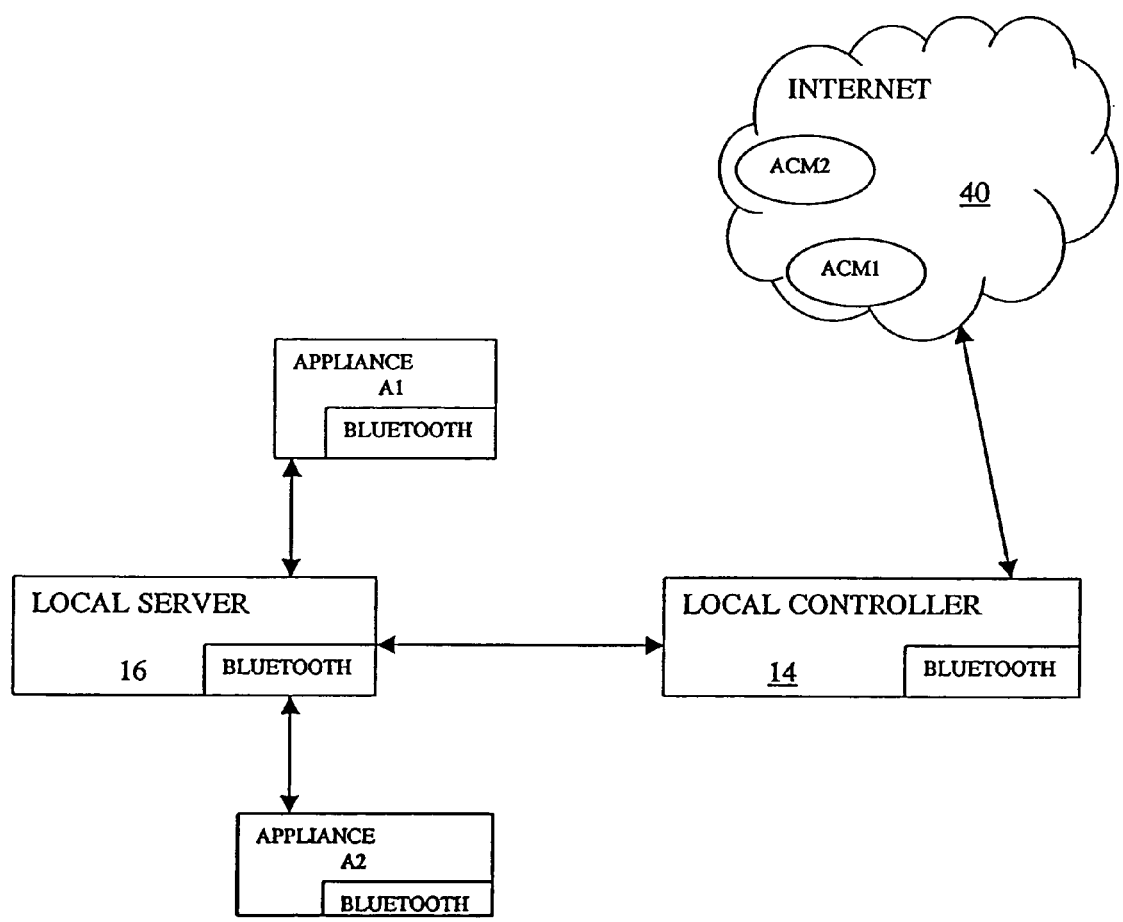
FIG. 2 is a schematic illustration of an appliance control network in accordance with an alternative embodiment of the present invention.

Although for an Internet ACM location, the network 10 of FIG. 1 contemplates ACM transmission from the Internet to the control block 12, it will be appreciated that such transmission can occur directly or indirectly with the local controller 14 as shown in FIG. 2. In this embodiment, the local controller 14, such as a mobile phone, will access the Internet in a known manner and request the transmission of the desired ACM. The ACM can be transmitted directly to the mobile phone, which will then transmit it for storage and installation to the local server 16, or the ACM can be transmitted directly to the local server 16. In either case, the desired ACM is accessed from an Internet-stored location and installed onto the local server 16 for use in controlling a corresponding appliance (e.g. A1 or A2).

To ensure interoperability between different platforms, the appliance control module software can introduce the appliance as a remote method invocation (RMI) service with an appropriate Java interface. The appliance control modules can also be separately built for different operating systems and languages, in which case the appliance control module may be downloaded from the remote server URL as platform-dependent binary code. The operating system of the server appliance will then be automatically checked and a correct driver selected. The appliance control modules can also include proprietary user interface solutions for different appliances. These can also be either platform-independent Java code or platform dependent binary code. When the driver has been loaded to the local server and access of the user to control the appliance has been checked (as explained below), the user can utilize the driver software to control the appliance.

The appliance control module user interface solution can be HTML based, or a combination of HTML and an operating-system dependent plug-in. The browser can be a WML browser or a HTML browser. Additionally, the browser can also support Java applets. Authentication of the remote server using, for example, screen script language (SSL) or other methods may be needed when new ACMs are downloaded from a remote server or whenever the appliance is accessed.

If the local server software is operating from a stationary PC, such as a PC located in a home containing the appliances, the local controller or phone can establish a connection with the PC as depicted in FIG. 2, and the PC will control the appliances. As explained above, the home control application can be a web server enabling local and global access to the home control application over the Internet. The PC can also utilize a wireless application protocol (WAP) gateway to enable the use of the home control application with WAP phones. In this manner, the local controller can access the local server via the Internet to instruct the control of certain appliances from a remote location. Locally, Bluetooth can be used to directly access the local PC based server from the local controller or phone. For example, if a mobile phone is used as a local controller 14, and in the case of controlling a room heat thermostat in a user's home containing the local server 16, the phone will access the local server to command operation of the thermostat (e.g., to turn on/off, set temperature, etc.). This may be accomplished by accessing the local server via a Bluetooth connection when the user is in the home, or via an Internet connection outside of the user's home which provides access to the local server by using the phone. Once accessed, the desired appliance and command will be selected by the user pressing appropriate buttons on the phone such as by selecting commands from a menu on the phone. Such functionality can also be employed to access other appliances, such as a VCR, by a user in a remote location instructing the local server to operate the VCR for recording a desired program, etc.

It is contemplated that, from time to time, manufacturers may update certain appliance control modules for various reasons such as to implement improved control features or correct operational defects, etc. Thus, the local controller or local server may contact the manufacturers' URL addresses to determine whether such updated ACMs exist, whereupon the updated ACMs will be installed on the local server 16 to replace or modify or upgrade existing ACMs for that appliance.

For security purposes, it is desirable that only authorized users of appliances be given access to control such appliances. Thus, and in accordance with the present invention, an authentication feature is provided to determine whether a particular user is authorized to access a particular appliance. The authentication feature links the appliance and the local server to each other with a designated user identification. This is easily implemented where, for example, the local server is a mobile phone, by using the SIM and PIN of the phone. If the local server is a PC or other processor device, a password can be selected. When the local controller is first used to access a particular appliance, the local controller (e.g. phone) will be designated in the local server as a master controller for that device. The master controller device can then designate additional users to have access for controlling the particular appliance.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for networking and controlling appliances within a local environment containing a local server responsive to commands received from a mobile phone or a personal digital assistant having a local controller function, each controllable appliance being controllable by a corresponding appliance control module, comprising the steps of:
    receiving, in response to a request transmitted within the local environment, an address of a remote location maintaining appliance control modules for each controllable appliance;
    obtaining the appliance control module by using the addresses to contact the remote location maintaining the appliance control module;
    installing on the local server, the appliance control module for each controllable appliance;
    providing communication between the local server and the controllable appliances; and
    accessing the local server with the local controller when the local controller is one of within the local environment and outside the local environment to select one of the installed appliance control modules for controlling the corresponding appliance.

2. The method of claim 1, wherein each appliance has a memory-stored address for providing a location of the corresponding appliance control module, said method further comprising the steps of transmitting the memory-stored address from the appliance to the local controller, and accessing a remote location using the transmitted address to locate the corresponding appliance control module.

3. The method of claim 2, wherein the local controller, local server and each appliance contains a wireless transceiver, and wherein said step of transmitting comprises the step of wirelessly transmitting.

4. The method of claim 2, wherein the memory-stored address is a URL Internet address.

5. The method of claim 4, wherein said accessing step comprises the step of connecting to the Internet using the URL to locate the appliance control module.

6. The method of claim 2, wherein said local server comprises a personal computer.

7. The method of claim 2, wherein the appliances, local server and local controller are capable of wirelessly communicating with each other using Bluetooth transceivers.

8. The method of claim 2, wherein said step of transferring comprises the step of accessing the remote location; transferring the located appliance control module to the local controller; and transferring the appliance control module from the local controller to the local server.

9. The method of claim 1, wherein the local controller and the local server comprise an integrally formed wireless communications device.

10. The method of claim 9, wherein said wireless communications device comprises one of a mobile phone and a personal digital assistant.

11. The method of claim 1, wherein the appliances, local server and local controller are capable of wirelessly communicating with each other using Bluetooth transceivers.

12. The method of claim 1, wherein the step of accessing further comprises providing a select user with access to the appliances based on a user identifier.

13. The method of claim 12, wherein the local controller is a mobile phone and wherein said step of providing a user with access further comprises using a SIM and PIN associated with the phone as the user identifier.

14. The method of claim 13, further comprising the step of using the local controller to grant a second device authority for accessing the local server.

15. The method of claim 12, wherein the local server is a personal computer and wherein said step of providing a user with access further comprises using a personal computer password as the user identifier.

16. The method of claim 1, further comprising the step of accessing the local server with the local controller to control a selected appliance with a corresponding appliance control module.

17. The method of claim 1, wherein the local controller comprises a mobile phone and wherein said accessing step comprises the step of selecting a command on the mobile phone to control a select appliance.

18. A network for controlling appliances within a local environment containing a local server responsive to commands received from a mobile phone or a personal digital assistant having a local controller function, each controllable appliance being controllable by a corresponding appliance control module, comprising:
   means for receiving in response to a request transmitted within the local environment, an address of a remote location maintaining appliance control modules for each controllable appliance;
   means for obtaining the appliance control module for each controllable appliance by contacting the remote location;
   means for installing on the local server, an obtained appliance control module for each appliance that is to be controlled;
   means for providing communication between the local server and the appliance; and
   means for accessing the local server with the local controller when the local controller is one of within the local environment and outside the local environment to select one of the installed appliance control modules for controlling the corresponding appliance.

19. The network of claim 18, wherein each appliance has a memory-stored address for providing a location of the corresponding appliance control module, said network further comprising means for transmitting the memory-stored address from the appliance to the local controller, and means for accessing a remote location using the transmitted address to locate the corresponding appliance control module.

20. The network of claim 19, wherein the local controller, local server and each appliance contain a wireless transceiver, and wherein said means for transmitting comprises means for wirelessly transmitting.

21. The network of claim 19, wherein the memory-stored address is a URL Internet address.

22. The network of claim 21, wherein said means for accessing comprises the step of connecting to the Internet using the URL to locate the appliance control module.

23. The network of claim 19, wherein the local controller and the local server comprise an integrally formed wireless communications device.

24. The network of claim 23, wherein said wireless communications device comprises one of a mobile phone and a personal digital assistant.

25. The network of claim 19, further comprising means for providing a select user with access to the appliances based on a user identifier.

26. The network of claim 25, wherein the local controller is a mobile phone and wherein said means for providing a user with access further comprises using a SIM and PIN associated with the phone as the user identifier.

27. The network of claim 26, further comprising means for the local controller to grant a second device authority for accessing the local server.

28. The network of claim 18, wherein said local server comprises a personal computer.

29. The network of claim 18, wherein the appliances, local server and local controller are capable of wirelessly communicating with each other using Bluetooth transceivers.

30. The network of claim 18, wherein the local server is a personal computer and wherein said means for providing a user with access further comprises using a personal computer password as the user identifier.

31. The network of claim 18, wherein said means for transferring comprises means for transferring the located appliance control module to the local controller and means for transferring the appliance control module from the local controller to the local server.

32. The network of claim 31, wherein the local controller comprises a mobile phone and wherein said means for accessing comprises entering a menu selection on the mobile phone.

33. A network for controlling a controllable appliance contained within a local environment, the appliance being controllable by a corresponding appliance control module and having a memory-stored address for providing a location of the corresponding appliance control module, comprising:
   one of a mobile phone and a personal digital assistant having a local controller having a wireless transceiver for communicating with the appliance and for receiving the memory-stored address from the appliance, the memory-stored address being used to locate the appliance control module;
   a local server in communication with said local controller for receiving an address of a remote location maintaining the appliance control module for each controllable appliance in response to a request for appliance control modules for each controllable appliance; obtaining the appliance control module for each controllable appliance by contacting the remote location maintaining the appliance control module; storing the located appliance control module; and, communicating with said local server when said local controller is one of within the local environment and outside the local environment for controlling the appliance corresponding to the located appliance control module.

34. The network of claim 33, wherein the memory-stored address corresponds to a location on a global computer network and wherein at least one of said local controller and local server is capable of communicating with said global computer network.

35. The network of claim 34, wherein said local controller is used to access the global computer network to locate the appliance control module and to transmit the appliance control module to said local server.

36. The network of claim 34, wherein said local controller, said local server and the appliance comprise Bluetooth transceivers for permitting wireless communication therebetween.

37. A mobile terminal for controlling appliances controllable by corresponding appliance control modules within a local environment, comprising:

means for sending a request for appliance control modules to each appliance;

means for receiving an address from each controllable appliance of a remote location maintaining the appliance control module for each controllable appliance in response to the request; said received remote location address being used to obtain a corresponding appliance control module for each controllable appliance by contacting the remote location maintaining the appliance control module;

means for allowing the input of user instructions and for generating output signals for controlling select controllable appliances; and means for communicating said output signals to a local server having said corresponding appliance control modules for controlling select ones of said controllable appliances.

38. The mobile terminal of claim 37, further comprising one of a mobile phone and a personal digital assistant.

39. An appliance having a corresponding appliance control module for controlling said appliance in a local environment; comprising:

means for storing an address in the appliance at which said appliance control module can be obtained from a remote location;

means for communicating said stored address in response to a request from a mobile terminal for locating said appliance control module, said stored address being used to obtain said corresponding appliance control module by contacting the remote location maintaining the appliance control module; and means responsive to commands from a local server in the local environment having said located appliance control module for controlling said appliance.

* * * * *